UNITED STATES PATENT OFFICE.

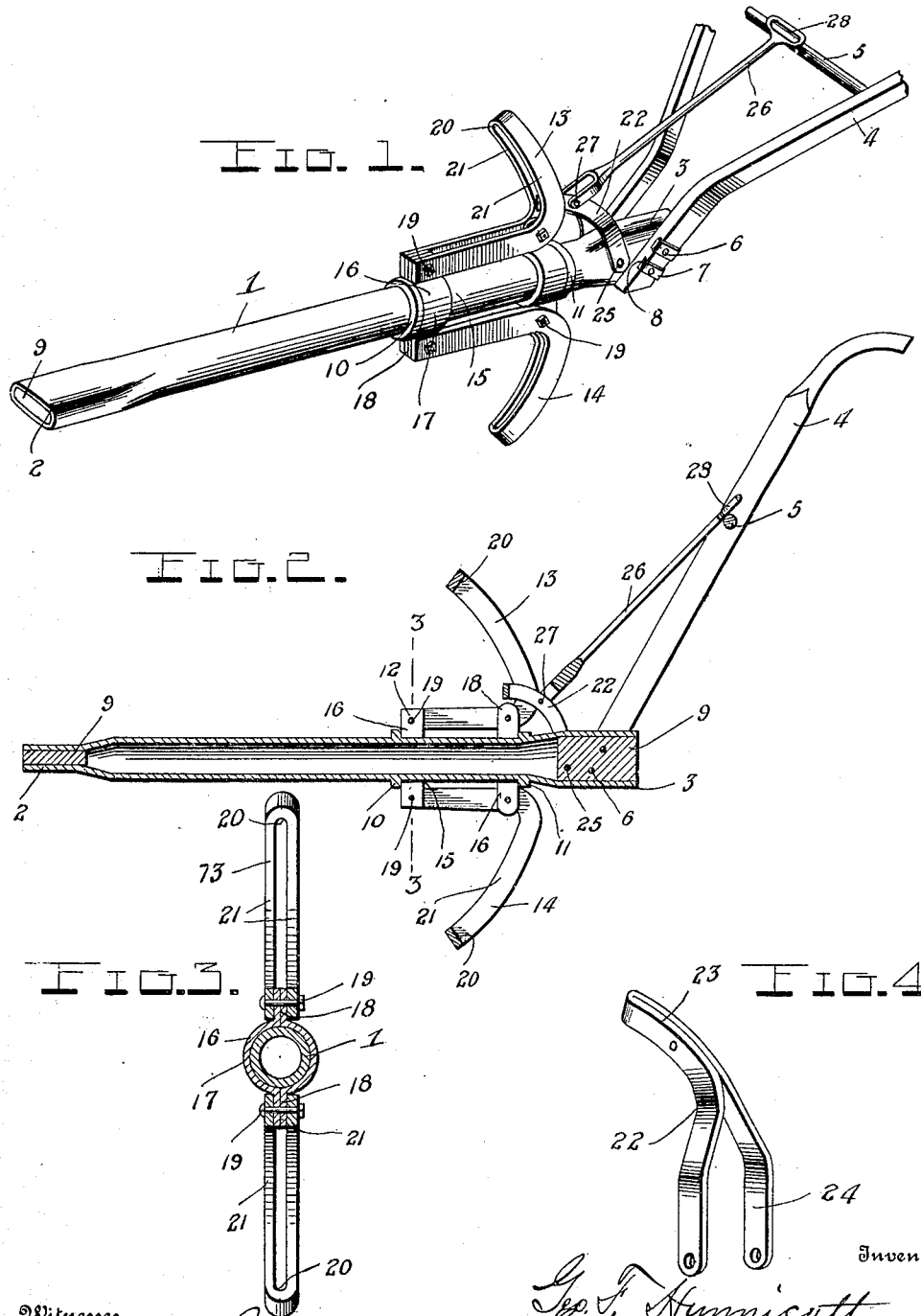

THOMAS B. CHAPPELEAR AND GEORGE F. HUNNICUTT, OF ATLANTA, GEORGIA.

PLOW.

No. 891,909.

Specification of Letters Patent.

Patented June 30, 1908.

Application filed August 27, 1907. Serial No. 390,414.

*To all whom it may concern:*

Be it known that we, THOMAS B. CHAPPELEAR and GEORGE F. HUNNICUTT, citizens of the United States, residing at Atlanta, in the county of Fulton and State of Georgia, have invented certain new and useful Improvements in Plows, of which the following is a specification, reference being had to the accompanying drawings.

Our invention relates to improvements in plows of that class known as side-hill plows and it consists in the novel construction and the combination and arrangement of parts hereinafter described and claimed.

The object of the invention is to improve and simplify the construction and operation of plows of this character and thereby render the same more durable and convenient in use and less expensive to manufacture.

The above and other objects which will appear as the nature of the invention is better understood, are attained in its preferred embodiment illustrated in the accompanying drawings, in which Figure 1 is a perspective view; Fig. 2 is a detail vertical longitudinal section; Fig. 3 is a vertical cross section taken on the plane indicated by the line 3—3 in Fig. 2, and Fig. 4 is a perspective view of the locking lever or latch.

In the drawings 1 denotes the beam of the plow which is preferably in the form of a cylindrical tube having its front end flattened upon its top and bottom as at 2 for the reception of a clevis or other draft device (not illustrated), and its rear end flattened upon each side as at 3 for engagement by the lower ends of the two handles 4. The latter are preferably of the usual construction being in the form of bars having parallel inner ends engaged with the opposite faces of the beam and outwardly curved or diverging outer ends connected by a cross bar 5 and terminating in handles. The parallel lower ends of the handle bars are preferably secured to the flat faces 3 of the beam by transverse bolts or similar fastenings 6 which pass through said parts and also through washer plates or clips 7 arranged upon the outer faces of the handle bars and having their ends 8 bent inwardly into engagement with the edges of said bars, as clearly shown in Fig. 1. If desired the flattened ends of the beam may be reinforced by filling blocks or plugs 9 of wood or any other suitable material.

Suitably secured to or formed upon the rear portion of the beam are two stop shoulders 10, 11 in the form of annular flanges. 12 denotes a frame adapted to rotate upon the portion of the beam between said stop shoulders and consisting of two end members or collars connected together and spaced apart by plow standards 13, 14. Each of said collars consists of two similar half sections having semi-circular central portions 17 and oppositely projecting apertured ends 18. The portions 17 of said half sections are adapted to receive the cylindrical bearing portion 15 of the beam 1 between them and the apertured ends 18 are adapted to be united by transverse bolts or similar fastenings 19. Each of the plow standards is of angular form and is constructed by doubling a metal strap upon itself as shown at 20 to provide spaced parallel members 21 and by bending the latter intermediate their ends to provide angularly disposed arms, one arm being adapted for the attachment of a plow, shovel or the like (not illustrated) and the other arm having its parallel members engaged with the ends 18 of said collar sections and formed with apertures to receive the fastening bolts 19 as clearly shown in Fig. 3. By constructing the revolving frame of the two sectional rotating collars or end members and making the plow standards of parallel angular members, a strong and durable device is produced which may be manufactured at a comparatively small cost.

In order to secure the revolving frame in an adjusted position upon the bearing portion 15 of the beam, we may provide any suitable locking device, but we preferably employ the one shown which is in the form of a pivoted locking lever or latch 22. The latter is curved longitudinally and is preferably formed by bending a metal strap upon itself and uniting its central part to provide a projecting tongue 23 which is adapted to enter the space between the parallel arms 21 of the standards and by spreading apart its free ends to provide a fork 24 which straddles the rear portion of the beam 1 and which is pivoted by a bolt or the like 25. By constructing and mounting the locking lever or latch in this manner, it will be seen that its free end or tongue 23 may be swung forwardly between the parallel arms of the uppermost standard so as to hold the revolving frame stationary with relation to the beam and to hold the lowermost standard in an operative position beneath the beam. For conveniently operating the latch lever, we preferably provide a rod 26 which has a forked or bifurcated end pivoted at 27 to said latch lever and a hand loop 28 at its upper end, which is adapted to rest upon the cross piece 5 connecting the handle bars 4.

From the foregoing description taken in connection with the accompanying drawings, it is thought that the construction, operation and advantages of the invention will be readily understood without a more extended explanation.

While we have shown and described the preferred embodiment of our invention, it will be understood that we do not wish to be limited to the precise construction herein set forth, and that various changes in the form, proportion and minor details may be resorted to without departing from the spirit or sacrificing any of the advantages of the invention.

Having thus described our invention what we claim is:

1. A plow of the character described, comprising a beam having a cylindrical bearing portion and stop shoulders at the ends of the latter, rotatable collars arranged upon said bearing portion and engaged with said stop shoulders, plow standards of angular form having one arm for the attachment of the plow and another arm secured to said collars to unite and space them apart and means upon the beam to engage said standards to prevent them from rotating.

2. A plow of the character described comprising a beam having a cylindrical bearing portion and stop shoulders at the ends of the latter, rotatable collars upon said bearing portion and engaged with said stop shoulders, each of said collars consisting of two similar half sections having opposing semi-circular central portions and oppositely projecting apertured ends, said ends of the half sections of each collar being adapted to engage each other, and plow standards of angular form composed of spaced parallel members, the members of one arm of each standard being adapted to receive the projecting ends of the collar sections between them and being formed with apertures to register with those in said ends of the collar sections, transverse fastenings passed through said registering apertures and means upon the beam to engage the standards and prevent them from rotating.

3. A plow of the character described, comprising a beam having a cylindrical bearing portion and stop shoulders at the ends of the latter, rotatable collars upon said bearing portion and engaged with said stop shoulders, each of said collars consisting of two similar half sections having opposing semi-circular central portions and oppositely projecting apertured ends, said ends of the half sections of each collar being adapted to engage each other, and plow standards of angular form composed of spaced parallel members, the members of one arm of each standard being adapted to receive the projecting ends of the collar sections between them and being formed with apertures to register with those in said ends of the collar sections, transverse fastenings passed through said registering apertures, a latch pivoted upon the beam and adapted to have its free end enter between the spaced members of the standards to hold the latter against rotation, and an operating rod connected to said latch.

In testimony whereof we hereunto affix our signatures in the presence of two witnesses.

THOMAS B. CHAPPELEAR.
GEORGE F. HUNNICUTT.

Witnesses:
C. D. JONES,
W. L. HUNNICUTT.